US006958135B1

(12) United States Patent
Filippi et al.

(10) Patent No.: US 6,958,135 B1
(45) Date of Patent: *Oct. 25, 2005

(54) ISOTHERMAL REACTOR FOR EXOTHERMIC OR ENDOTHERMIC HETEROGENEOUS REACTIONS

(75) Inventors: Ermanno Filippi, Castagnola (CH); Enrico Rizzi, Grandate (IT); Mirco Tarozzo, Ligornetto (CH)

(73) Assignee: Methanol Casale S.A., Lugano-Besso (CH)

( * ) Notice: Subject to any disclaimer, the term of this patent is extended or adjusted under 35 U.S.C. 154(b) by 330 days.

This patent is subject to a terminal disclaimer.

(21) Appl. No.: 10/009,783

(22) PCT Filed: Jun. 14, 2000

(86) PCT No.: PCT/EP00/05470

§ 371 (c)(1),
(2), (4) Date: Apr. 12, 2002

(87) PCT Pub. No.: WO00/76652

PCT Pub. Date: Dec. 21, 2000

(30) Foreign Application Priority Data

Jun. 15, 1999 (EP) .................................. 99111538

(51) Int. Cl.[7] .............................. F28D 7/04; F28D 7/10

(52) U.S. Cl. ...................... 422/198; 422/200; 422/201; 165/163

(58) Field of Search ................................ 422/146, 173, 422/198, 200, 201, 211; 165/156, 163

(56) References Cited

U.S. PATENT DOCUMENTS

| 2,248,993 A | * | 7/1941 | Houdry ...................... 422/200 |
| 3,663,179 A | * | 5/1972 | Mehta et al. ............... 422/148 |
| 4,339,413 A | * | 7/1982 | Lahne et al. ................ 422/200 |
| 4,636,365 A | | 1/1987 | Link et al. |
| 4,714,592 A | * | 12/1987 | Zanma et al. ............... 422/192 |
| 5,080,872 A | * | 1/1992 | Jezl et al. ................... 422/201 |
| 2002/0085969 A1 | * | 7/2002 | Filippi et al. |

FOREIGN PATENT DOCUMENTS

| AT | 362 397 | * | 5/1981 | ............ C01C 1/04 |
| AT | 362 397 B | | 5/1981 | |
| DE | 855 258 C | | 9/1952 | |

(Continued)

OTHER PUBLICATIONS

Ulrich Lahne & Rainer Lohmuller: "Schuttschichtreaktoren mit gewickelten Kuhlrohren, eine konstruktive Neuntwicklung zur Durchfuhrung exothermer katalytischer Prozesse" Shemie. Ingenieur. Technik., vol. 58, No. 3, 1986, pp. 212-215, XP002124824 Verlas Chemie Gmbh. Weinheim., DE IssN: 0009-286X.

(Continued)

Primary Examiner—Kevin P. Kerns
(74) Attorney, Agent, or Firm—Sughrue Mion, PLLC

(57) ABSTRACT

An isothermal reactor for carrying out heterogeneous exothermic or endothermic reactions, includes within a catalytic bed (3) housed in an appropriate outer shell (2), at least one tube (13) for the passage of a cooling or heating fluid which advantageously extends within the bed (3) along a plane substantially perpendicular with respect to opposed perforated side walls (4, 5) of the catalytic bed.

11 Claims, 7 Drawing Sheets

FOREIGN PATENT DOCUMENTS

| | | | |
|---|---|---|---|
| DE | 33 18098 A1 | 11/1984 | |
| DE | 37 08 957 A * | 10/1988 | ........... C01B 17/04 |
| EP | 0 534 195 A | 3/1993 | |
| EP | 0 534 195 A1 * | 9/1993 | ............. B01J 8/02 |
| FR | 841.683 | 5/1939 | |
| GB | 391 444 * | 4/1933 | ............. B01J 8/02 |
| GB | 391 444 A | 4/1933 | |
| GB | 1 270 568 A | 4/1972 | |
| GB | 2 204 055 A * | 11/1988 | ............ C07C 1/04 |
| WO | WO 94 12274 A | 6/1994 | |

OTHER PUBLICATIONS

International Search Report for PCT/IB00/00636.

* cited by examiner

ISOTHERMAL REACTOR FOR EXOTHERMIC OR ENDOTHERMIC HETEROGENEOUS REACTIONS This is a National Stage entry of Application PCT/EP00/05470, with an international filing date of Jun. 14, 2000, which was published as WO Publication No. 00/76652 A1, and the complete disclosure of which is incorporated into this application by reference.

FIELD OF APPLICATION

The present invention relates to an isothermal reactor for carrying out exothermic or endothermic heterogeneous reactions, comprising:
- a preferably vertical, outer shell of substantially cylindrical shape;
- at least one catalytic bed provided in the shell and comprising opposed perforated side walls for the inlet of a flow comprising reactants and the outlet of a flow comprising reacted substances, respectively; and
- at least one tube passing through said at least one catalytic bed for the passage of a cooling or heating fluid.

In the following description and attached claims, with the term: "isothermal reactor", it is intended to mean a reactor wherein the temperature within the catalytic bed(s) where the reaction takes place is maintained essentially constant, such reaction may be either exothermic or endothermic.

Reactors of this kind may for example be employed in the synthesis of chemicals such as methanol or formaldehyde (strongly exothermic reactions) or styrene (strongly endothermic reactions).

As known, in the field of exothermic or endothermic heterogeneous synthesis, the need is more and more felt of realizing isothermal reactors of high capacity that on one side are easy to manufacture, reliable and require low investment and maintenance costs, and on the other side allow to operate with low pressure drops, low energy consumption and with a high heat exchange efficiency between the reactants and the cooling or heating fluid.

PRIOR ART

In order to comply with the above mentioned need, isothermal reactors have been proposed in the field, which are provided with a catalytic bed of radial type comprising a large number of vertical straight tubes within it for drawing off or supplying heat.

For example, DE-A-3 318 098 discloses an isothermal reactor for carrying out exothermic or endothermic heterogeneous syntheses wherein the gaseous reactants pass through the catalytic bed radially and come in contact with a plurality of vertical tubes arranged within said bed.

According to an embodiment which is not shown, it is also foreseen that the tubes for drawing off or supplying the heat extends helically about a central collector for the outlet of the reacted gases from the reactor.

In particular, the bundle of helicoidal tubes extends vertically between opposed upper and lower tube plates, wherein such tubes are twisted round each other.

It shall be noticed that helicoidal arrangements for the tubes for drawing off or supplying heat are known also in the isothermal reactors provided with axial catalytic bed. See for instance U.S. Pat. No. 4,339,413 and U.S. Pat. No. 4,636,365.

Although advantageous under certain aspects (for example, the radial arrangement of the catalytic bed allows to obtain in an easy and cost-effective way higher production capacities with lower pressure drops and lower energy consumption than with an axial bed), the isothermal reactor with a helicoidal tube bundle disclosed in DE-A-3 318 098 has a number of drawbacks, which are set forth hereinbelow.

First of all, the arrangement of the tubes as a helicoidal tube bundle—although better than the arrangement of vertical straight tubes—does not match effectively the temperature curve of the flow of gaseous reactants that pass through the catalytic bed with a radial motion.

In fact, the gas flow flowing perpendicularly with respect to the vertical extension of the helicoidal tubes, comes in contact—passing through the catalytic bed—with different tubes at different temperatures, and this causes a low heat exchange efficiency between the gaseous reactants and the cooling or heating fluid.

In other words, in case of exothermic reactions with the gaseous reactants that flow in centripetal radial motion through the catalytic bed, the outer helicoidal tubes are crossed by a gas that has just started to react, and is thus relatively cold, whereas the helicoidal tubes which are closer to the core are crossed by a gas at higher and higher temperature that exchanges with them an ever increasing amount of heat until a point is reached, where the temperature of the reaction gas is at its maximum. From there on, the temperature decreases and hence the amount of heat which is absorbed by the helicoidal tubes arranged next to the gas outlet wall of the catalytic bed is progressively smaller. (see DE-A-3 318 098, FIG. 3).

Therefore, each helicoidal tube receives a different amount of heat and must stand a different thermal load. This causes a bad distribution of temperature within the catalytic bed detrimental for the heat exchange efficiency.

For example, whenever hot water flows inside the tubes as cooling means, and it is transformed into steam, it is clear that each tube of a helicoidal tube bundle as suggested in DE-A-3 318 098, produces a different amount of steam.

This implies relevant problems of control and feed/draw off for the cooling fluid at the tube plates, as well as a bad distribution of the water and of the steam inside said tubes.

In this respect, it is worth noticing how all the tubes of the isothermal reactor described in DE-A-3 318 098 are parallel to each other, that is to say they are fed from the same source and discharge at the same point. Hence the pressure drop available for each helicoidal tube is the same.

In DE-A-3 318 098, the helicoidal tubes in contact with the gaseous reactants at low temperature are subjected to a small thermal load, which means a low degree of vaporization of the water with ensuing low outlet velocity and therefore high water flow rates (calculated as mass flow rates). The helicoidal tubes in contact with the gaseous reactants at high temperature are instead subjected to a great thermal load, which means a high degree of vaporization of the water with ensuing high outlet velocity and therefore low water flow rates (calculated as mass flow rates).

Therefore, when the reactor is operating, a situation occurs wherein the coils which undergo the greatest thermal load are those which are supplied with less water and are prone to have an ever increasing degree of vaporization and an ever decreasing capacity of drawing off the heat. This brings to a far from optimum distribution of temperature within the catalytic bed, in case of slightly exothermic reactions such as the methanol synthesis whilst in case of fast and strongly exothermic reactions such as the formaldehyde synthesis, this may even bring to a temperature sharp rise.

Further on, the excessive vaporization promotes the formation inside the tubes of deposits of residues present in the water to the detriment of the heat exchange efficiency of the tubes themselves.

All these disadvantages are independent from the fact that the tubes are arranged at different distances depending on the profile of temperature of the gaseous reactants within the catalytic bed.

A further disadvantage of the reactor according to the prior art is given by the high structural complexity deriving from the helicoidal arrangement of the tube bundle that requires high investment and maintenance costs.

Further on, the provision of tube plates—which generally need to be very thick and hence expensive because of the difference of pressure between the gaseous reactants and the cooling or heating fluid—is a constraint as far as the number of tubes which may be arranged is concerned, with ensuing further detriment of the heat exchange efficiency of the reactor.

Because of these disadvantages, isothermal reactors for carrying out exothermic or endothermic heterogeneous syntheses with a radial catalytic bed and a helicoidal tube bundle have been indeed used quite seldom to date (and this is even more true for reactors with a vertical tube bundle), notwithstanding the ever increasing need felt in the field of having high capacity reactors.

SUMMARY OF THE INVENTION

The problem underlying the present invention is that of providing an isothermal reactor for carrying out exothermic or endothermic heterogeneous reactions which is easy to realize, reliable and requires low investment and maintenance costs and allows to operate with low pressure drop, low energy consumption and with a high heat exchange efficiency between the reactants and the cooling or heating fluid.

The aforesaid problem is solved, according to the invention, by a reactor of the above mentioned type, that is characterized in that said at least one tube for drawing off or supplying heat extends within said at least one catalytic bed along a plane substantially perpendicular with respect to the side walls of the bed.

Thanks to the present invention, it is advantageously possible to realize—in an easy and cost-effective way—an isothermal reactor with a high heat exchange coefficient, to all advantage of the conversion yield and of the energy consumption.

In fact, differently from the helicoidal tubes according to the prior art that extend from one end to the other of the catalytic bed in a direction substantially parallel with respect to the perforate side walls for the feed and extraction of the gaseous flow, according to the present invention each single tube for drawing off or for supplying heat extends along a plane within the catalytic bed substantially perpendicular with respect to the side walls for the passage of the reactants.

In this way, the tube(s) is (are) advantageously arranged in a substantially parallel way with respect to the direction of crossing of the catalytic bed by the flow comprising reactants.

This means that each single tube is in contact with a same portion of reactants and matches advantageously all the heat variations, and hence the temperature profile, of such portion of reactants from the inlet to the outlet of the catalytic bed.

By consequence, whenever within the catalytic bed(s), a plurality of tubes is arranged according to the present invention, they all withstand the same thermal load. For example, in case of an exothermic reaction, with hot water as cooling fluid, all the tubes produce the same amount of steam (uniform distribution of the water and steam inside the tubes).

In other words, thanks to the present invention, each tube is able to draw off or to supply the same amount of heat and it is thus possible to obtain an optimum distribution of the temperature within the catalytic bed, also for strongly exothermic or endothermic reactions. This is to all advantage of the heat exchange efficiency of the catalytic bed and hence of the conversion yield inside the bed itself and of the respective energy consumption.

With respect to the above described isothermal reactor with reference to the prior art, the reactor according to the present invention allows to recover or supply heat at a higher thermal level, with ensuing increase of the heat exchange efficiency and of the conversion yield. Or, again, the conversion yield being the same as for the prior art, the increase of the heat exchange efficiency permits to decrease the required catalyst volume, with ensuing savings in terms of space and investment costs.

A further advantage of the present invention is that, when a plurality of tubes are arranged inside a catalytic bed, these may all be fed from a same source as there are no control problems for the supply and extraction of the cooling/heating fluid, all the tubes being subjected to the same thermal load.

Finally, it shall be noticed how the reactor according to the present invention is particularly easy to be realized and does not require tube plates, with ensuing relevant savings in terms of investment and maintenance costs.

The features and the advantages of the present invention will become clear from the following indicative and non-limiting description of an embodiment of the invention, made with reference to the attached drawings.

DETAILED DESCRIPTION OF A PREFERRED EMBODIMENT

With reference to FIGS. 1–5, an isothermal reactor according to the present invention for carrying out exothermic or endothermic heterogeneous reactions is indicated in its whole with 1.

The reactor 1 comprises an outer shell 2 of substantially cylindrical shape, inside which a catalytic bed is housed, generally indicated with 3.

The catalytic bed 3 is delimited on its sides by opposed perforated side walls 4 and 5, for the inlet of a flow comprising reactants and for the outlet of a flow comprising reacted substances, respectively.

Generally speaking, the substances which are fed to the reactor 1 for carrying out the exothermic or endothermic heterogeneous syntheses are in gaseous phase.

Therefore, in the description below, with the terms: "flow comprising reactants" and "flow comprising reacted substances", it is intended to mean a flow of gaseous reactants and a flow of reacted gases, respectively. It is anyway clear that the reactor according to the present invention might be employed also for reactions occurring in liquid phase or liquid/gaseous phase, respectively.

In the example described hereinbelow, the perforated walls 4 and 5 are hence gas permeable with respect to the inlet in the catalytic bed 3 of a flow of gaseous reactants and to the outlet of a flow of reacted gases, respectively.

Figure 1:
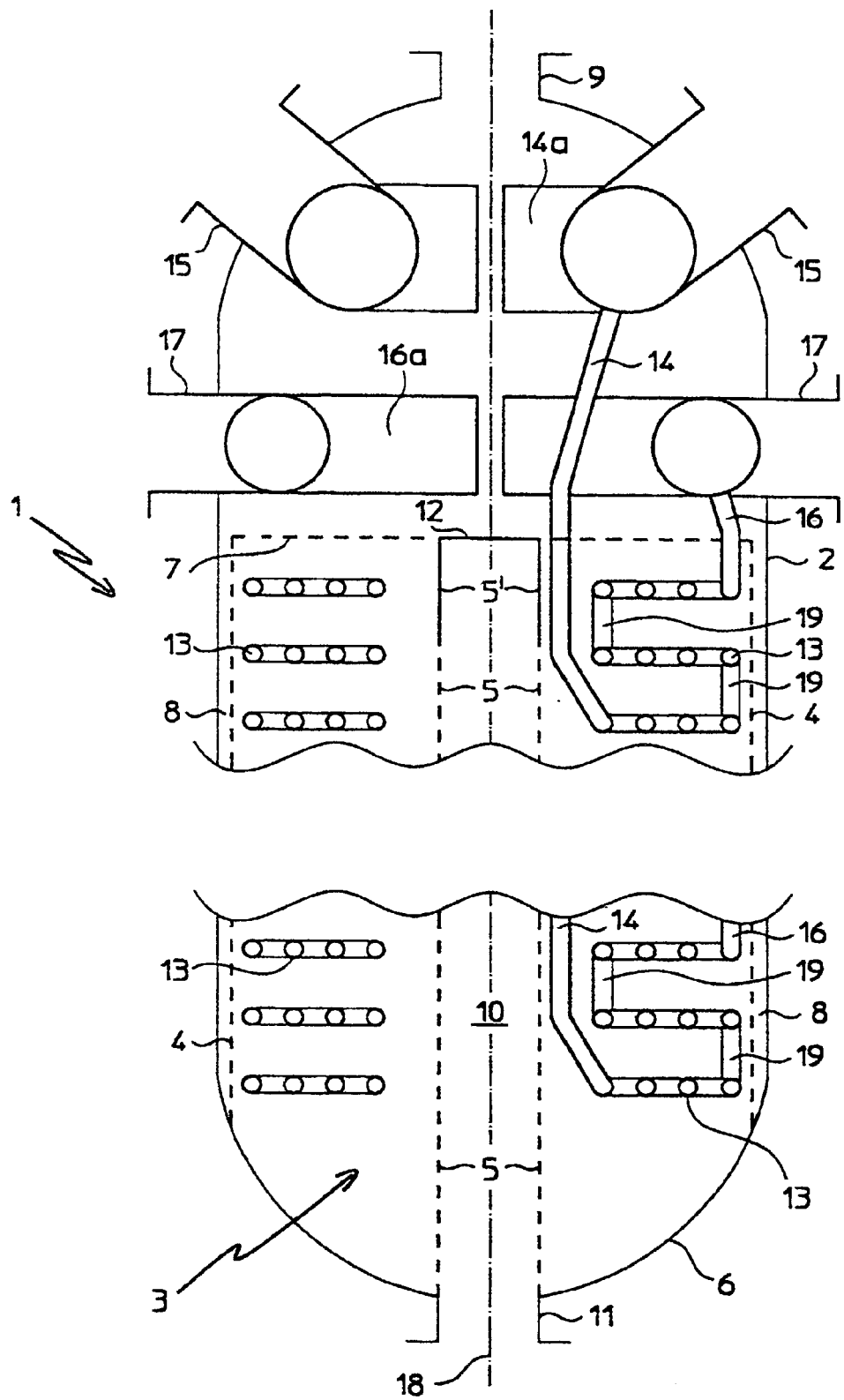
FIG. 1 shows a partial view in longitudinal section of an isothermal reactor for carrying out exothermic or endothermic heterogeneous reactions according to an embodiment of the present invention.

The catalytic bed 3 is further delimited in its lower part by an unperforated bottom (not permeable to gases), that corresponds in the example of FIG. 1 with the bottom 6 of the reactor 1, and in its upper part by a perforated wall 7 (gas permeable) for the passage with axial motion through the bed 3 of a minor portion of the gaseous reactants.

In order to allow a correct axial-radial crossing of the catalytic bed 3, the radial part being preponderant with respect to the axial part, the side wall 5 has a small unperforated portion 5' (not permeable to gases) that extends from an upper end thereof.

The wall 7 permeable to gases is anyway totally optional, featuring mainly the function of holding the catalyst (not represented in FIG. 1) inside the bed 3, so that it may be well left apart.

Alternatively, whenever a merely radial crossing of the catalytic bed is required, a wall 7 is provided, which is not perforated or anyway not permeable to the gas.

Both the catalytic bed of the radial type and, even in a more remarkable way, that of the axial-radial type are particularly advantageous as they allow to obtain high conversion yields and at the same time low pressure drops for the gaseous reactants, by making use of more active catalysts of smaller granulometry.

Between the shell 2 and the side wall 4 there is provided an annular space 8 for allowing an optimum distribution and feed of the gaseous reactants in the catalytic bed 3. To this end, the space 8 is in fluid communication with a gas inlet nozzle 9.

In turn, the side wall 5 defines inside it a duct 10 for the collection and ejection from the reactor of the flow of reacted gases. To this end, the duct 10 is in fluid communication with a gas outlet nozzle 11 and is closed on its upper side by a baffle 12 not permeable to gases.

In order to allow the draw off or the supply of heat from or to the gases flowing inside the catalytic bed 3, so as to maintain the reactor 1 isothermal, the bed 3 is crossed by a plurality of tubes, which are all indicated by numeral 13, for the passage of a cooling or heating fluid, respectively.

The cooling or heating fluid is fed to the tube 13 through a duct 14 in fluid communication with one or more inlet nozzles 15, and extracted from the tubes 13 through a duct 16 in fluid communication with one or more outlet nozzles 17.

The number of nozzles 15 and 17, respectively, (equal to two as far as the instant example is concerned) is chosen according to the cooling or heating fluid flow rate. Preferably, the more relevant such flow rate, the larger the number of outlet nozzles 15 and 17.

The duct(s) 14 are in fluid communication with the nozzle(s) (15) through a toroidal collector 14a, whereas the duct(s) 16 are in fluid communication with the nozzle(s) 17 through a toroidal collector 16a.

According to a particularly advantageous aspect of the present invention, the tubes 13 for drawing off or supplying heat, extend as a coil within the catalytic bed 3 along a plane substantially perpendicular with respect to the side walls 4 and 5 thereof.

In the following description and attached claims, with the term: "coil tube ", it is intended to mean a tube which is substantially curvilinear or provided alternatively with curvilinear and straight sections.

In doing so, each tube 13 is crossed for all its length by a same portion of reactant gases, thus being able to follow all the thermal variations, and hence the temperature profile, of such gas portion from the inlet to the outlet of the catalytic bed 3.

In addition, the tubes 13 formed as a coil along respective planes substantially parallel to each other, all undergo the same thermal load and operate hence in the same way.

This results in an optimal distribution of the temperatures inside bed 3, without the risk of sharp temperature rises, and an efficient heat exchange between the gaseous reactants and the cooling or heating fluid to all advantage of the conversion yield and of the energy consumption.

In the example of FIG. 1, the shell 2 is arranged vertically and the tubes 13 extend as coils within the catalytic bed 3 along a plane that is preferably substantially horizontal.

Nothing prevents, anyway, from arranging the tubes 13 in a different way, for example in groups of tubes overlaid with respect to each other, which extend along vertical planes.

In both instances, the tubes are perpendicular with respect to the side walls 4 and 5, as well as with respect to the longitudinal axis 18 of the shell 2 in case of a vertical reactor, whereas they are substantially parallel with respect to the crossing direction of the bed 3 by the flow of gaseous reactants.

It is clear, that within the scope of the present invention, there is also foreseen a reactor 1 comprising a plurality of catalytic beds 3, wherein the beds may be crossed by a variable number of tubes 13 (at least one) according to the exothermal degree of the reaction and/or the dimensions of the catalytic bed.

In the scope of the present invention it is also comprised a reactor 1 comprising one or more catalytic beds crossed by the flow of reactants with mainly radial motion from the centre (duct 10) towards the outer periphery (space 8).

Still, according to a further, not shown, embodiment of the present invention, it is possible to foresee an outer shell of the horizontal type comprising one or more catalytic beds crossed by tubes for drawing off or supplying heat, that extend as coils along planes perpendicular with respect to the gas-permeable walls for the inlet and outlet of the gaseous reactants. In this case, as well, the perforated side walls of the catalytic bed(s) are parallel with respect to the longitudinal axis of the shell.

The tubes 13 may be singularly connected to the nozzles 15 and 17, and hence each tube 13 is connected to a feed duct 14 and a duct 16 for drawing off the cooling or heating fluid, respectively. They may also be connected to groups of at least two tubes, i.e. to a duct 14 and a duct 16 for each group of tubes 13, or through a single duct 14 or 16, respectively, so that all the tubes 13 are connected to each other.

Preferably, the tubes 13 are connected to each other—at respective free ends—in groups of at least two tubes, each group being in fluid communication with a duct 14 for feeding and a duct 16 for drawing off the cooling or heating fluid, respectively. The various ducts 14 and 16 are, in turn, in fluid communication with the nozzle 15 and with the nozzle 17, respectively.

Figure 2:
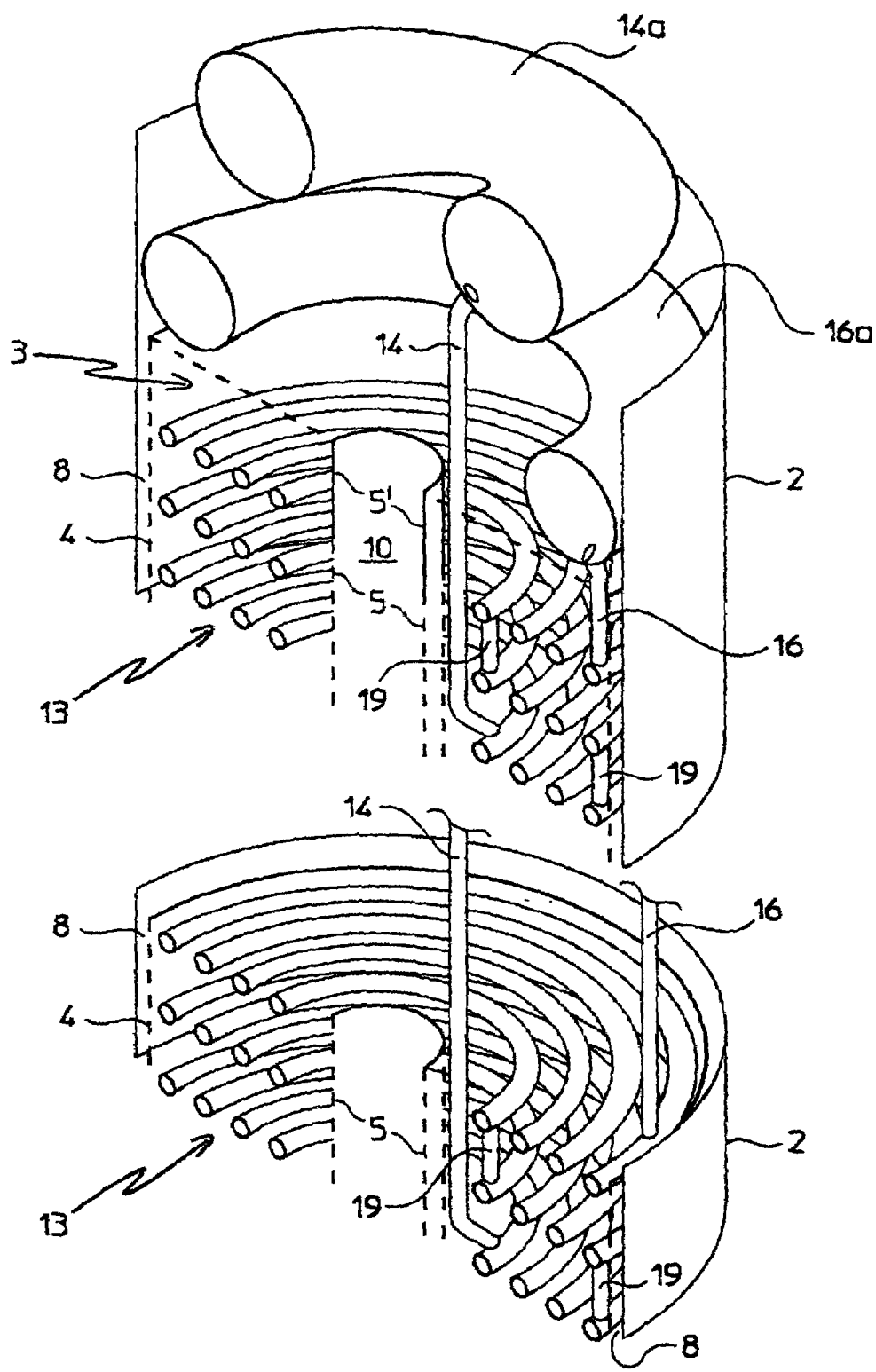
FIG. 2 shows an enlarged schematic prospective view of a detail of the reactor of FIG. 1.
Figure 3:
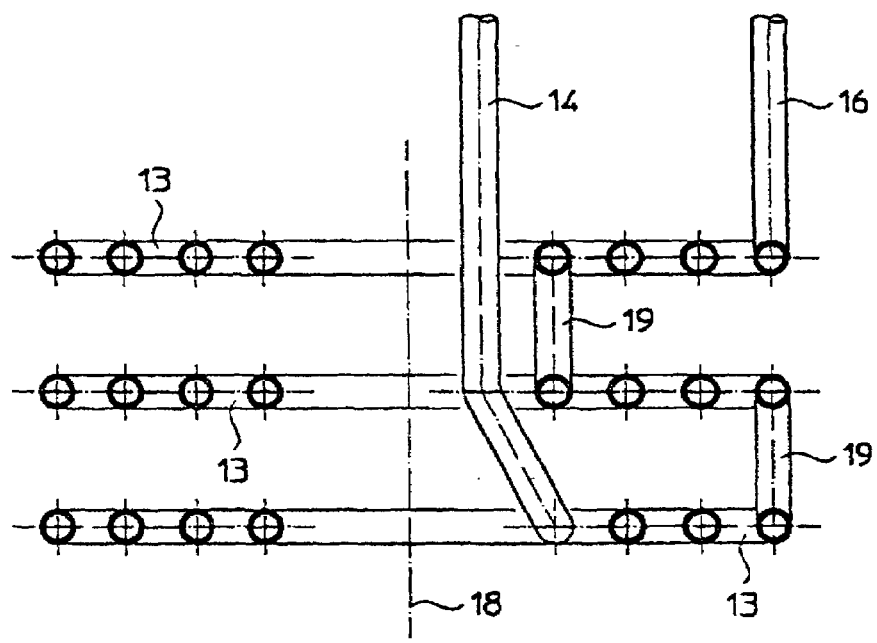
FIG. 3 shows an enlarged schematic view in longitudinal section of a detail of the reactor of FIG. 1.

The connection between single adjacent tubes is accomplished by means of connecting pipes, all indicated with 19, as better shown in FIGS. 2 and 3.

In case of a plurality of ducts 14 and 16, these lead into the respective collectors 14a and 16a as well as into the respective tubes 13 preferably at an angularly offset position with respect to each other.

In the example of FIG. 1, the first and the last group of tubes 13 comprised in the catalytic bed 3 are shown.

The cooling or heating fluid is fed by means of respective ducts 14 in correspondence of one end of the lower tubes 13 of each group, is made to pass through the tubes 13 of each group, wherein heat exchangers of the same entity take place, and finally drawn off by means of respective ducts 16 from an end of the upper tubes 13 of each group.

Alternatively, it is possible to provide for a crossing of the groups of tubes by the cooling or heating fluid in a direction downwards. In this case, the fluid is fed to the tubes 13 through the ducts 16 and is drawn through the ducts 14.

It shall be noticed how the resulting construction is easy to realize and to operate, and how the provision of a tube plate is not required, with ensuing savings in terms of investment and maintenance costs with respect to the prior art.

The embodiment shown in FIG. 1 is more advantageous than the one wherein each single tube 13 is separately connected to the nozzles 15 and 17, particularly for long reactors which are provided with a lot of tubes 13. In fact, the number of ducts 14 and 16 is reduced (depending on the number of tubes 13 making up each group).

Further on, the embodiment shown in FIG. 1 is more advantageous than the one wherein all the tubes 13 are connected to each other, with the tubes at the respective lower and upper ends connected to a single duct 14 and 16, respectively, as there is a lower pressure drop for the cooling or heating fluid.

On the other hand, the structure with all the tubes 13 being connected to each other, is particularly easy to be realized, as it needs only one feed duct 14 and one drawing off duct 16 for the cooling or heating fluid.

Figure 4:
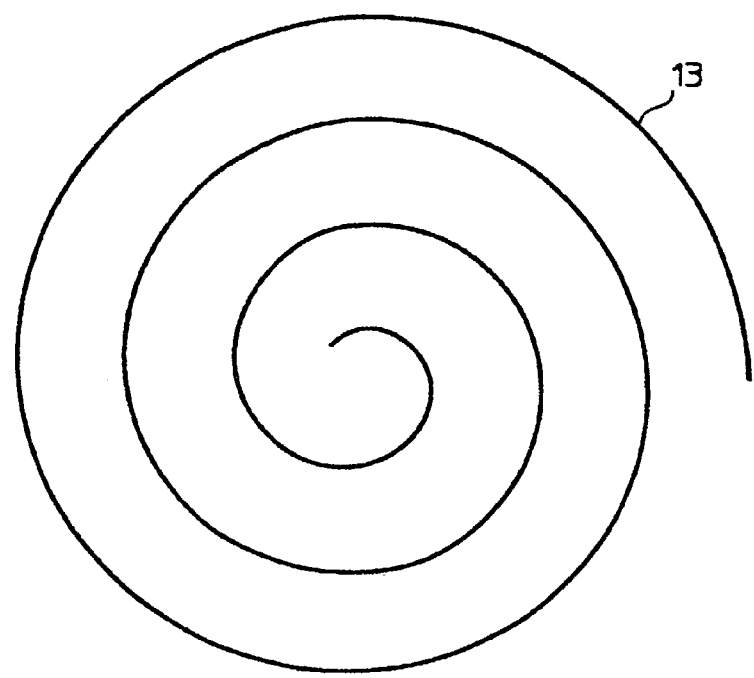
FIG. 4 shows a schematic view in cross section of a coil tube at constant pitch for the passage of a cooling or heating fluid, of the type employed in the reactor of FIG. 1.
Figure 5:
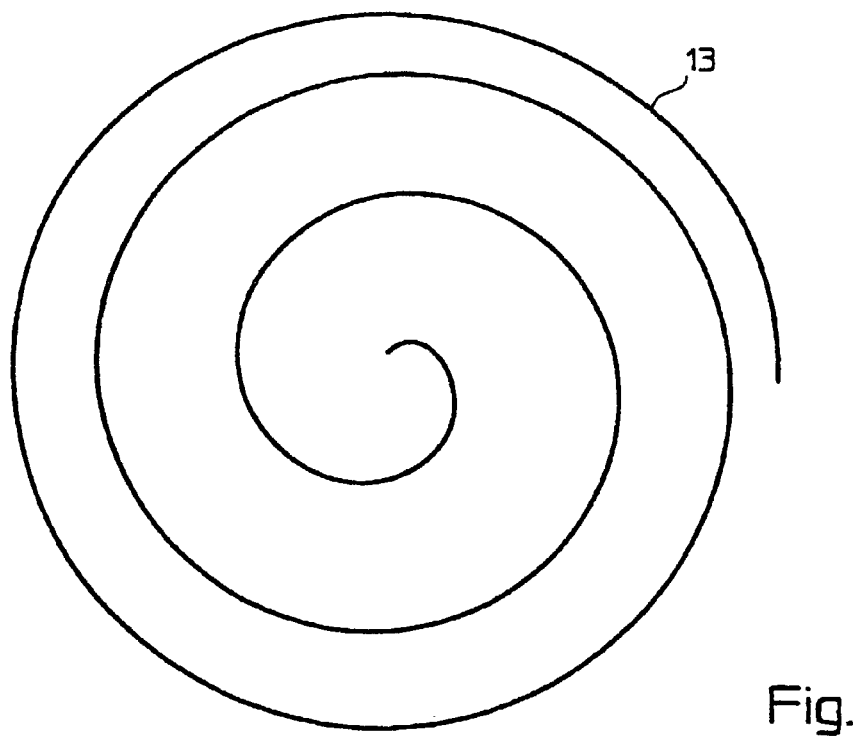
FIG. 5 shows a schematic view in cross section of the tube of FIG. 4 at variable pitch.

Preferably, the tube(s) 13 crossing the catalytic bed 3 for drawing off or for supplying heat are realized with a spiral-shaped coil as shown in FIGS. 4 and 5.

In fact, the spiral shape of tubes 13 has been found to be particularly advantageous both in terms of heat exchange efficiency and in terms of simplicity and flexibility of construction.

The spiral-shaped tube 13 may adapt itself to the most varying dimensions of the catalytic bed 3, and in particular it is able to cover all the portions of the same, thus allowing an effective heat exchange to take place everywhere in the bed.

Further on, according to the amount of heat to be drawn off or to be supplied, the spiral-shaped tube 13 may be realized with turns at a more or less close distance.

In the example of FIG. 4, the spiral tube is realized with a constant winding pitch, that is to say a constant distance between two adjacent turns.

In this respect, particularly advantageous results have been obtained varying the winding pitch in accordance with the variation of the radius of the spiral, in such a way to adapt itself to the temperature profile of the gaseous reactants within the catalytic bed 3, following all its thermal variations.

In this instance, shown in FIG. 5, the distance between adjacent turns varies in accordance with the variation of the radius of the spiral and, preferably, the winding pitch decreases as the spiral radius increases.

In order to take into account in the best way the heterogeneous distribution of the flow of gaseous reactants in the catalytic bed 3, in particular for an axial-radial bed, the tubes 13 may be advantageously arranged at a varying distance between the planes of two adjacent tubes.

In doing so, it is possible to adapt the distance of the tubes 13 according to the amount of heat to be drawn off or to be supplied, in other words, following the temperature profile in the catalytic bed 3, to all advantage of the degree of heat exchange efficiency, which favorably affects the conversion yield and the energy consumption.

According to this embodiment, not shown, it is possible to obtain a higher concentration of tubes 13 (smaller distance between the planes of two adjacent tubes) where a higher flow rate of gaseous reactants and hence greater thermal loads is to be found, and a lower concentration of tubes 13 (larger distance between the planes of two adjacent tubes) where the flow rate is lower.

Figure 6:
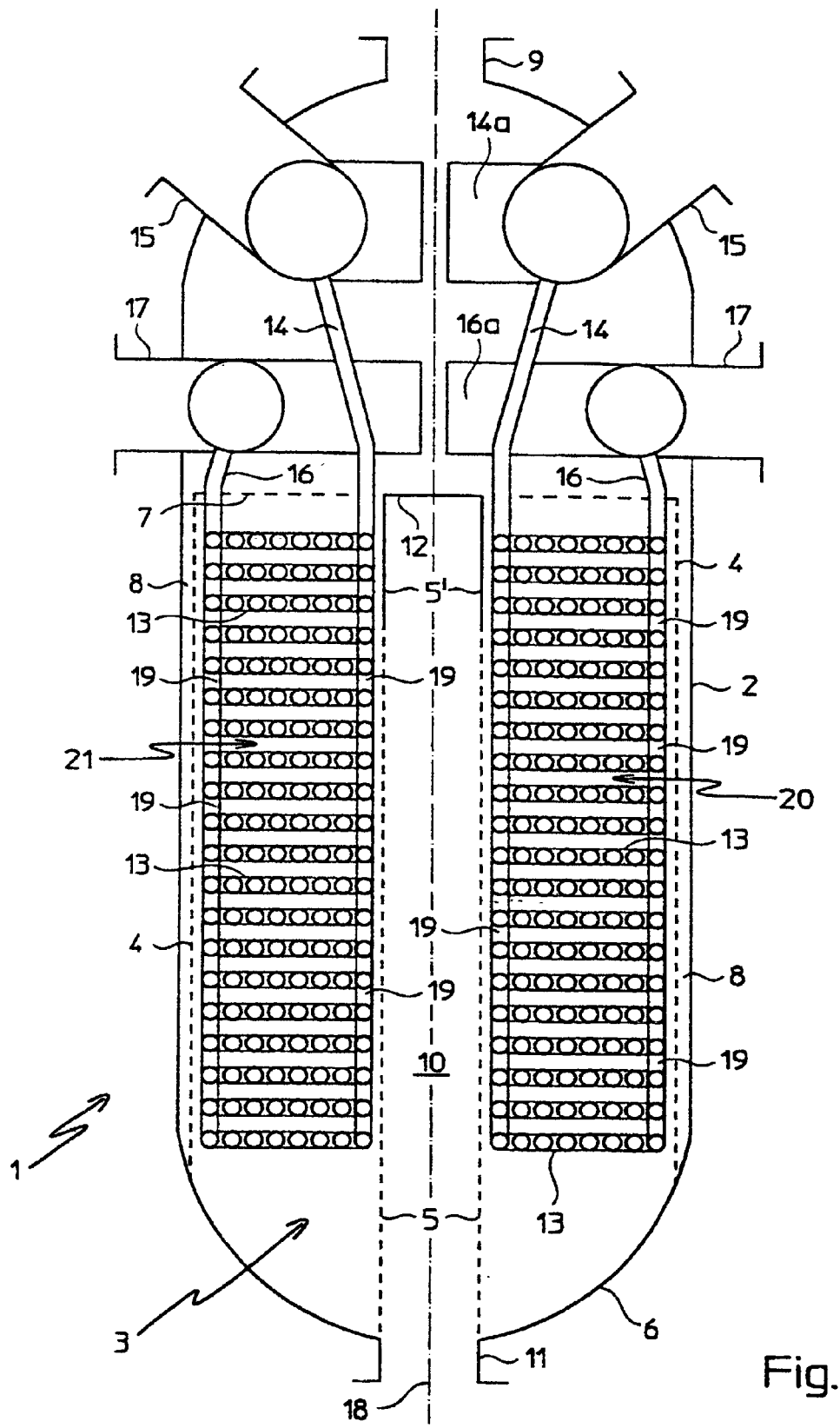
FIG. 6 shows a view in longitudinal section of an isothermal reactor for carrying out exothermic or endothermic heterogeneous reactions according to a further embodiment of the present invention.

In FIG. 6 an isothermal reactor is shown, for carrying out exothermic or endothermic heterogeneous reactions according to a further embodiment of the present invention.

In such figure, the details of reactor 1 which are equivalent to those illustrated in FIG. 1 from the structure and operation point of view, will be indicated with the same reference numerals and will not be described any more.

Figure 7:
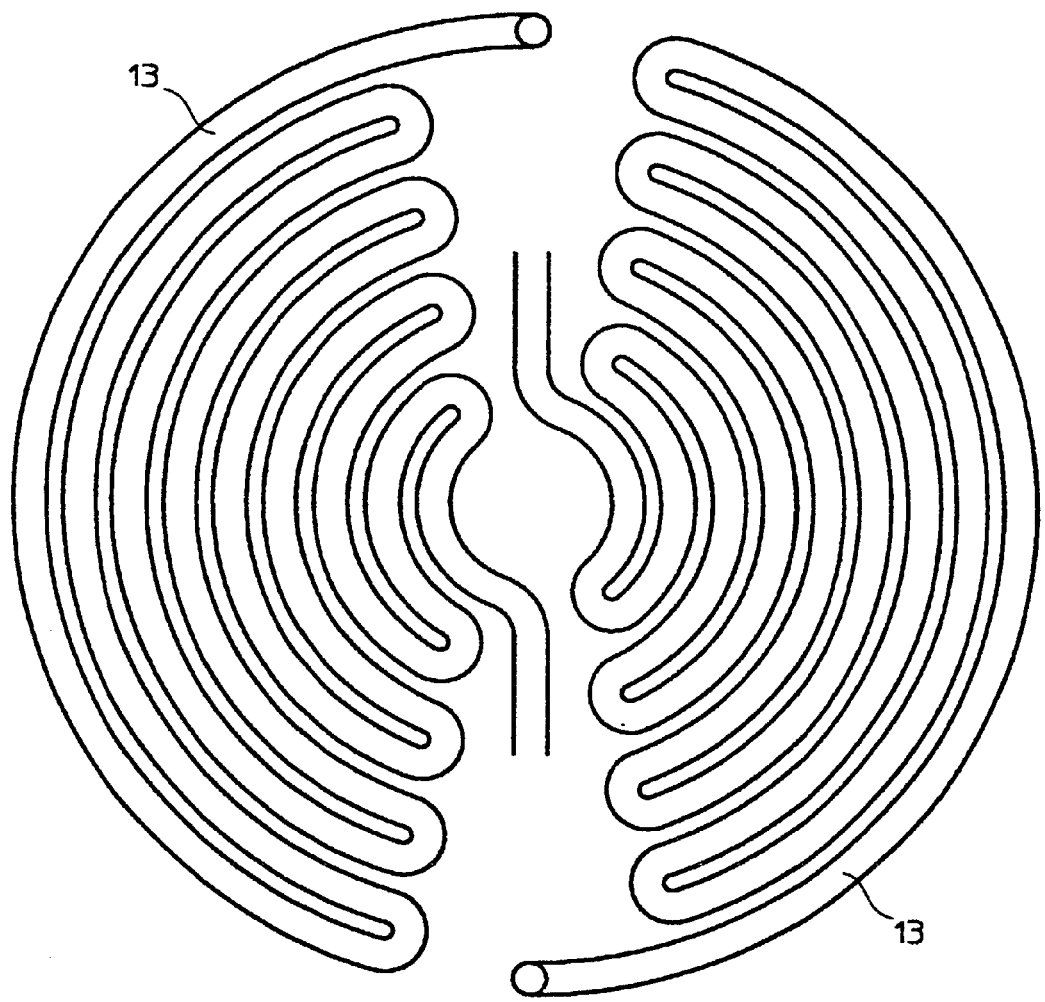
FIG. 7 shows a schematic view in cross section of two coil tubes arranged side-by-side for the passage of a cooling or heating fluid, of the type employed in the reactor of FIG. 6.

In the example of FIG. 6, it is important to notice how in correspondence of a predetermined horizontal plane two tubes 13 arranged side-by-side are provided, as better shown in FIG. 7. Heat exchanges of equal entity take place inside the tubes 13 arranged side-by-side.

All the tubes 13 of each series 20 and 21, respectively, are advantageously connected to each other by means of connecting pipes 19, so as to form two parallel series of tubes 13, generally indicated with 20 and 21. Further on, each series 20, 21 is connected by means of respective lower and upper tubes 13 to only one feed duct 14 and drawing off duct 16 for the cooling or heating fluid, respectively.

In particular, the tubes 13 extend as a coil having the shape of an arc of a circle of increasing length from a central zone to a peripheral zone.

The tubes 13 of each series 20, 21 may be of course arranged divided in groups inside the reactor of FIG. 6, such as in the example of FIG. 1.

The main difference with respect to the example of FIG. 1 is given by the fact that in such example each single tube 13 extended along the entire section of the catalytic bed 3, while now the tubes 13, which are arranged side-by-side, would respectively take up a circular sector (half section). This implies doubling the number of tubes and in case also of the cooling or heating fluid feed and drawing off ducts 14 and 16, respectively, as well as of the connecting pipes 19.

This tubes arrangement may be well suited for extremely exothermic or endothermic reactions as it allows to have two feeds and extractions for the cooling or heating fluid, thus increasing the heat exchange efficiency.

In this respect, arrangements with three or more coil-shaped tubes 13 arranged side-by-side in correspondence of a same horizontal plane may also be advantageously foreseen.

Figure 8:
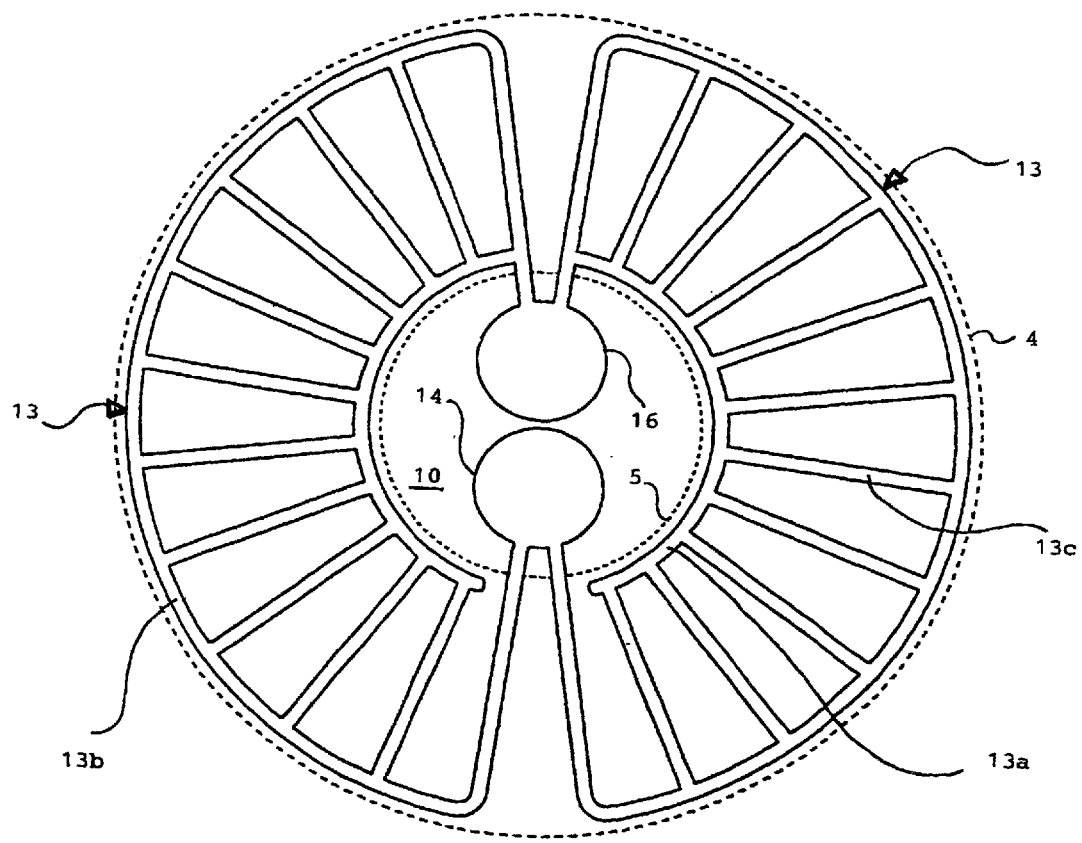
FIG. 8 shows a schematic view in cross section of two tubes arranged side-by-side for the passage of a cooling or heating fluid, according to a further embodiment of the present invention.

In FIG. 8, a further embodiment is shown of the side-by-side tube arrangement.

In this case, the two tubes 13 arranged side-by-side along a predetermined horizontal plane, comprise a first and a second tube portion (13a, 13b) having the shape of an arc of circle of different length arranged near a central zone of the bed 3 and a peripheral zone thereof, respectively. Moreover, a plurality of third tube portions 13c connecting the second tube portion 13b with the first tube portion 13a are provided.

Preferably, the third tube portions 13c are straight and extend radially from the second to the first tube portion.

According to this embodiment, only one feed duct 14 and one drawing off duct 16 are required. Both ducts 14 and 16 are disposed in the central duct 10 and are in fluid communication with all the tubes 13 side by side.

Tubes 13 of the type shown in FIG. 8 allow very good heat exchange efficiency. In fact, in addition to the advantages set forth with respect to the tubes arrangement of FIG. 7, the cooling or heating fluid flows within tubes 13 in substantial pure co-current or counter-current motion with respect to the flow of reagents gases within the catalyst bed 3, so as to improve the heat exchange efficiency.

Moreover, the presence of the radially extending plurality of tube portions 13c allows to advantageously reduce the pressure drop of the cooling or heating fluid flowing through tubes 13.

The reactor according to the present invention may be advantageously employed for carrying out essentially all kinds of exothermic or endothermic reactions. In particular, examples of exothermic reactions that are well suited for being carried out with the present invention may be: methanol, ammonia, formaldehyde, organic oxidation (for example ethylene oxide), whereas, examples of endothermic reactions may be: styrene and methylbenzene.

Fluids such as hot water, that transforms into steam at a high thermal level, or melted salts or diathermal oils are preferably used for drawing off the heat (in case of exothermic reactions). Analogous fluids may also be used for supplying heat in case of endothermic reactions.

The operation of the reactor 1 for carrying out exothermic or endothermic reactions according to the invention is described hereinbelow.

It shall be noticed how the operating conditions of pressure and temperature of the gaseous reactants fed to the catalytic bed 3 as well as those of the cooling or heating fluid passing through the tubes 13 are those conventional for the specific kind of reaction intended to be carried out, and therefore will not be described in specific detail in the description below.

As an example, only the operating conditions for the methanol synthesis are given: synthesis pressure 50–100 bar, synthesis temperature 200–300° C., pressure of the steam generated 15–40 bar.

With reference to FIG. 1, a flow of gaseous reactants is fed to the catalytic bed 3 through the gas inlet nozzle 9 and flows inside it through the perforated walls 4 and 7. The catalytic bed 3 is then crossed with a mainly radial (axial-radial) motion by the gaseous reactants that react when they enter in contact with the catalyst.

The heat developed during the synthesis reaction or required for carrying out such reaction is respectively drawn off or supplied by a fluid passing through the tubes 13.

Such fluid is introduced into the reactor 1 through the nozzle 15 and fed to the lower tubes 13 of each group through the ducts 14. Then it passes through the tubes 13 of each respective group that are connected in correspondence of their free ends by connecting pipes 19, it is drawn off from the upper tubes 13 of the respective groups through the ducts 16 and evacuated from reactor through the gas outlet duct 11.

Finally, the flow of reacted gases obtained in the catalytic bed 3 leaves the latter through the perforated wall 5, is collected in the duct 10 and then ejected from the reactor 1 through the gas outlet duct 11.

The operation of the reactor 1 of FIG. 6 is analogous to that of FIG. 1, with the exception that the cooling fluid contemporaneously flows through two series 20 and 21 of tubes 13 arranged side-by-side. Further on, as the tubes 13 of each series are all connected to each other, the cooling fluid is fed through a duct 14 in correspondence of a lower tube 13 and goes up through all the catalytic bed 3 passing through the tubes 13 before going out from the upper tube 13 in order to be drawn off from the reactor 1 through the nozzle 17.

Advantageously, it is important to notice that the tubes 13 extend within the catalytic bed 3 along a plane substantially parallel with respect to the crossing direction of the catalytic bed by the flow of gaseous reactants.

From the above description, the numerous advantages achieved by the present invention clearly arise, in particular the provision of a reactor for carrying out exothermic or endothermic reactions which is easy to realize, reliable and requires low investment and maintenance costs, and at the same time allows to operate at a high conversion yield, low pressure drops, low energy consumption and with a high efficiency of heat exchange between the gaseous reactants and the cooling or heating fluid.

What is claimed is:

1. Isothermal reactor for carrying out heterogeneous exothermic or endothermic reactions, comprising:
    a preferably vertical, outer shell (2) of substantially cylindrical shape;
    at least one catalytic bed (3) provided in the shell (2) and comprising opposed perforated side walls (4, 5) for the inlet of a flow comprising reactants and the outlet of a flow comprising reacted substances, respectively; and
    at least one tube (13) passing through said at least one catalytic bed (3) for the passage of a cooling or heating fluid;
    characterized in that said at least one tube (13) extends within said at least one catalytic bed (3) along a plane substantially perpendicular with respect to the side walls (4, 5).

2. Reactor according to claim 1, characterized in that said at least one tube (13) extends within said at least one catalytic bed (3) along a substantially horizontal plane.

3. Reactor according to claim 1, characterized in that said at least one tube (13) extends as a spiral-shaped coil.

4. Reactor according to claim 3, characterized in that said spiral-shaped coil has a winding pitch that varies in accordance with the variation of the radius of the spiral.

5. Reactor according to claim 4, characterized in that said winding pitch decreases as the radius of the spiral increases.

6. Reactor according to claim 1, characterized in that it comprises a plurality of tubes (13) arranged in said at least one catalytic bed (3) at a variable distance between adjacent tubes (13).

7. Reactor according to claim 1, characterized in that it comprises a plurality of tubes (13) in said at least one catalytic bed (3) overlaid with respect to each other and connected at respective free ends.

8. Reactor according to claim 6, characterized in that said tubes (13) are connected to each other in groups of at least two tubes, each group being in fluid communication with a duct (14, 16) for feeding and drawing off said cooling or heating fluid, respectively.

9. Reactor according to claim 1, characterized in that it comprises a plurality of tubes (13) arranged side-by-side are provided in correspondence of at least one predetermined plane substantially perpendicular with respect to said side walls (4, 5) within said at least one catalytic bed (3).

10. Reactor according to claim 9, characterized in that said at least two tubes (13) arranged side-by-side extend as a coil having the shape of an arc of a circle of increasing length from a central zone of said bed (3) to a peripheral zone thereof.

11. Reactor according to claim 9, characterized in that said at least two tubes (13) arranged side-by-side comprise a first and a second tube portion (13*a*, 13*b*) having the shape of an arc of a circle of different length arranged near a central zone of said bed (3) and a peripheral zone thereof, respectively, and a plurality of third tube portions (13*c*) connecting said second with said first tube portion (13*b*, 13*a*).

* * * * *